United States Patent [19]

Niratsuka et al.

[11] Patent Number: 5,606,740
[45] Date of Patent: Feb. 25, 1997

[54] TIME DELAY CONTROLLED SWITCHING FOR A DC/DC CONVERTER IN A SELECTIVE CALL DEVICE FOR REDUCING RIPPLE

[75] Inventors: Kimitoshi Niratsuka; Noriaki Shirai; Hirokazu Tanaka, all of Kawasaki, Japan

[73] Assignee: Fujitsu Limited, Kawasaki, Japan

[21] Appl. No.: 190,524

[22] Filed: Feb. 2, 1994

[30] Foreign Application Priority Data

Mar. 22, 1993 [JP] Japan ................... 5-062030

[51] Int. Cl.$^6$ ........................................ H04B 1/16
[52] U.S. Cl. ........................... 455/343; 455/38.3
[58] Field of Search ................... 455/38.3, 343, 455/127; 340/825.44; 323/283, 288, 901; 363/49, 95

[56] References Cited

U.S. PATENT DOCUMENTS

| | | | |
|---|---|---|---|
| 4,340,973 | 7/1982 | Umetsu | 455/343 |
| 4,634,956 | 1/1987 | Davis et al. | 323/283 |
| 4,962,349 | 10/1990 | Albach et al. | 363/49 |
| 5,274,369 | 12/1993 | Tsunoda et al. | 455/343 |

FOREIGN PATENT DOCUMENTS 0105752  8/1979  Japan ................... 323/901

Primary Examiner—Reinhard J. Eisenzopf
Assistant Examiner—Thanh Le
Attorney, Agent, or Firm—Staas & Halsey

[57] ABSTRACT

A power-supply control circuit comprises a power-supply conversion circuit for converting a primary power-supply voltage into a secondary power-supply voltage; a first switching element for placing the power-supply conversion circuit into an active state or an inactive stage; a capacitor for smoothing the secondary power-supply voltage; a second switching element for placing a load circuit powered by the smoothed secondary power-supply voltage into an active state or an inactive state; and a control circuit for supplying a control mode signal to the first switching element and the second switching element, respectively. A radio select call receiver comprises a radio reception unit driven by a first power-supply voltage for receiving radio carrier waves and identifying a unique call signal conveyed by the radio carrier waves; a signal processing unit performing various kinds of call processing based on the unique call signal; and a power-supply control circuit. The power-supply circuit comprises a power-supply conversion circuit for converting a primary power-supply voltage into a secondary power-supply voltage, a first switching element for placing the power-supply conversion circuit into an active state or an inactive state, a capacitor for smoothing the secondary power-supply voltage, a second switching element for placing a signal processing unit driven by the smoothed secondary power-supply voltage into an active state or an inactive state, and a control circuit for supplying a control mode signal to the first switching element and the second switching element, respectively.

13 Claims, 9 Drawing Sheets

FIG.13(A) SB

FIG.13(B) VS (RELATED)

FIG.13(C) VS (INVENTION)

TIME DELAY CONTROLLED SWITCHING FOR A DC/DC CONVERTER IN A SELECTIVE CALL DEVICE FOR REDUCING RIPPLE

BACKGROUND OF THE INVENTION

1. Field of the Invention

The present invention relates to a power-supply control circuit and a radio select call receiver. Specifically, the present invention relates to a control circuit for supplying power to a circuit with a small load and relates to improvement of a radio receiver provided with a sampling-operation function for reducing current consumption by the circuit.

2. Description of the Related Art

In recent years, transistor circuits driven by a low voltage have been employed as a variety of electronic devices, accompanying the increased density and the enhanced integration of semiconductor integrated circuits which are referred to hereafter as LSIs. In particular, such transistor circuits have been used to reduce the power consumption of battery-driven handy equipment. For example, the production of radio select call receivers is under way. A radio select call receiver executes message processing when it receives a radio call signal that matches its call code identification to be described later. Normally, a radio call signal is generated by a radio base station as carrier waves which are transmitted after being modulated by a call code signal.

The radio select call receiver employs a DC/DC converter for supplying a secondary power-supply voltage to a load circuit thereof. The DC/DC converter is controlled to operate in a stand-by mode. However, a capacitor connected to the output of the DC/DC converter lengthens the rise time of the output voltage. In addition, the switching operation of the DC/DC converter generates a ripple component on the secondary power-supply voltage.

Addressing the problems described above, a technology to which the present invention relates is explained. Let us take a radio select call receiver for carrying out message outputting operations based on a result of decoding a radio call signal S1 as an example. As shown in FIG. 1, the radio select call receiver comprises, among other components, a battery EB serving as a primary power supply, a radio reception unit 1, a wave-form shaping unit 2, a decoder 3, a central processing unit 4, a call output circuit 5, a call generator 6 and a DC/DC converter 7. It should be noted that the central processing unit 4 is abbreviated hereafter simply as the CPU.

The DC/DC converter 7 converts a primary power-supply voltage VBB output by the battery EB into a secondary power-supply voltage VSB which is then supplied to the radio reception unit 1, the wave-form shaping-circuit unit 2, the decoder 3, the CPU 4 and the call output circuit 5.

In addition, a switching element M2 is connected to the DC/DC converter 7. In a stand-by mode, the switching element M2 is turned on and off. It should be noted that the stand-by mode is abbreviated hereafter simply as the SB mode. Even though the location at which the switching element M2 is connected is not an issue; in the example shown in FIG. 1, the switching element M2 is connected between the DC/DC converter 7 and a ground line GND in order to simplify the explanation.

When the user turns on a main switch M1, the radio select call receiver functions, demodulating modulated carrier waves received from a radio station which serves as a transmitter of the carrier waves. The modulated carrier waves are electrical waves modulated by a radio call signal S1 in the radio station. To be more specific, the modulated carrier waves are received by the radio reception unit 1 employed by the radio select call receiver.

At that time, the carrier waves modulated by the radio call signal S1 are received in a sampling operation in the SB mode in order to reduce the power consumed by the radio select call receiver out off the battery EB. Powered by both the primary and secondary power-supply voltages VBB and VSB, the radio reception unit 1 carries out signal processing.

After undergoing a wave-form shaping operation in the wave-form shaping circuit unit 2, the radio call signal S1 is decoded by the decoder 3 to determine whether or not the radio call signal S1 matches a unique call code ID peculiarly assigned to this particular radio select call receiver. If a decoding result indicates that the radio call signal S1 matches the unique call code ID, a decoding-result signal is output by the CPU 4 to a call output circuit 5. The radio select call receiver then exits from the SB mode temporarily in order to prolong the period of time in which the DC/DC converter is generating an output. During the period extension, the call generator 6 is driven by the call output circuit 5 to display a message or to generate call sound.

SUMMARY OF THE INVENTION

It is an object of the present invention to reduce power consumption by devising a technique for supplying power in accordance with the magnitude of a load consuming the power, and to provide a secondary power-supply voltage with its ripple components suppressed for a circuit having a small load magnitude.

It is another object of the invention to drive load circuits working intermittently in such a way that, the load circuits are driven by energy accumulated in an capacitor during inoperative periods of the load circuits for processing loads which are small enough to allow signal processing to be completed in a short time of the order of several tens of milliseconds.

It is still another object of the invention to use a power-supply control circuit for controlling supplies of a secondary power-supply voltage through a relay in such a way that the supplies of power are cut off sequentially one after another starting with a radio reception means completing desired signal processing.

A preferred embodiment implementing the principle of operation of a power-supply control circuit in accordance with the present invention is shown in FIG. 4. As shown in the figure, the embodiment comprises a power-supply conversion circuit for converting a primary power-supply voltage generated by a power supply into a secondary power supply voltage generated at its output, a first switching element for controlling the supply of power to the power-supply conversion circuit, a second switching element for controlling the supply of power to a load circuit driven by the secondary power-supply voltage, a capacitor for accumulating electric charge during an on state of the first switching element and discharging the electric charge during an on state of the second switching element and a control circuit for providing the first and second switching elements with control mode signals for operating the power-supply conversion circuit 11 and the load circuit intermittently.

Another preferred embodiment implementing the principle of operation of a radio select call receiver driven by a power-supply voltage generated by a battery serving as a primary power supply for receiving radio carrier waves in accordance with the present invention is shown in FIG. 6. As shown in the figure, the embodiment comprises a radio reception unit extracting a unique call signal from the radio carrier waves, a signal processing unit processing various kinds of call processing based on the unique call signal, power-supply conversion circuits for converting a primary power-supply voltage generated by a power supply into secondary power supply voltages respectively generated at their outputs, first switching elements for controlling the supplies of power to the power-supply conversion circuits respectively, a second switching element for controlling the supply of power to the radio reception unit driven by the secondary power-supply voltage, and a second switching element for controlling the supply of power to the signal processing unit driven by the secondary power-supply voltage, capacitors for accumulating electric charge during on states of the first switching elements and discharging the electric charge during on states of the second switching elements and a control circuit for providing the first and second switching elements with control mode signals for operating the power-supply conversion circuits, the radio reception unit as well as the signal processing means intermittently.

By adopting such a circuit configuration, the life of a battery-powered apparatus such as portable electronic equipment per battery is prolonged, allowing a low-power radio select call receiver or the like to be made for use by the consumer.

BRIEF DESCRIPTION OF THE DRAWINGS

FIGS. 13(A), 13(B) and 13(C) are diagrams used for comparing the wave forms of secondary power-supply voltages of the radio call receiver of FIG. 7 provided by the present invention and the radio select call receiver embracing a technology related to the present invention shown in FIG. 1; and FIGS. 14(A)–14(I) show operation time charts of the radio call receiver shown in FIG. 7.

DETAILED DESCRIPTION OF THE INVENTION

Figure 1:
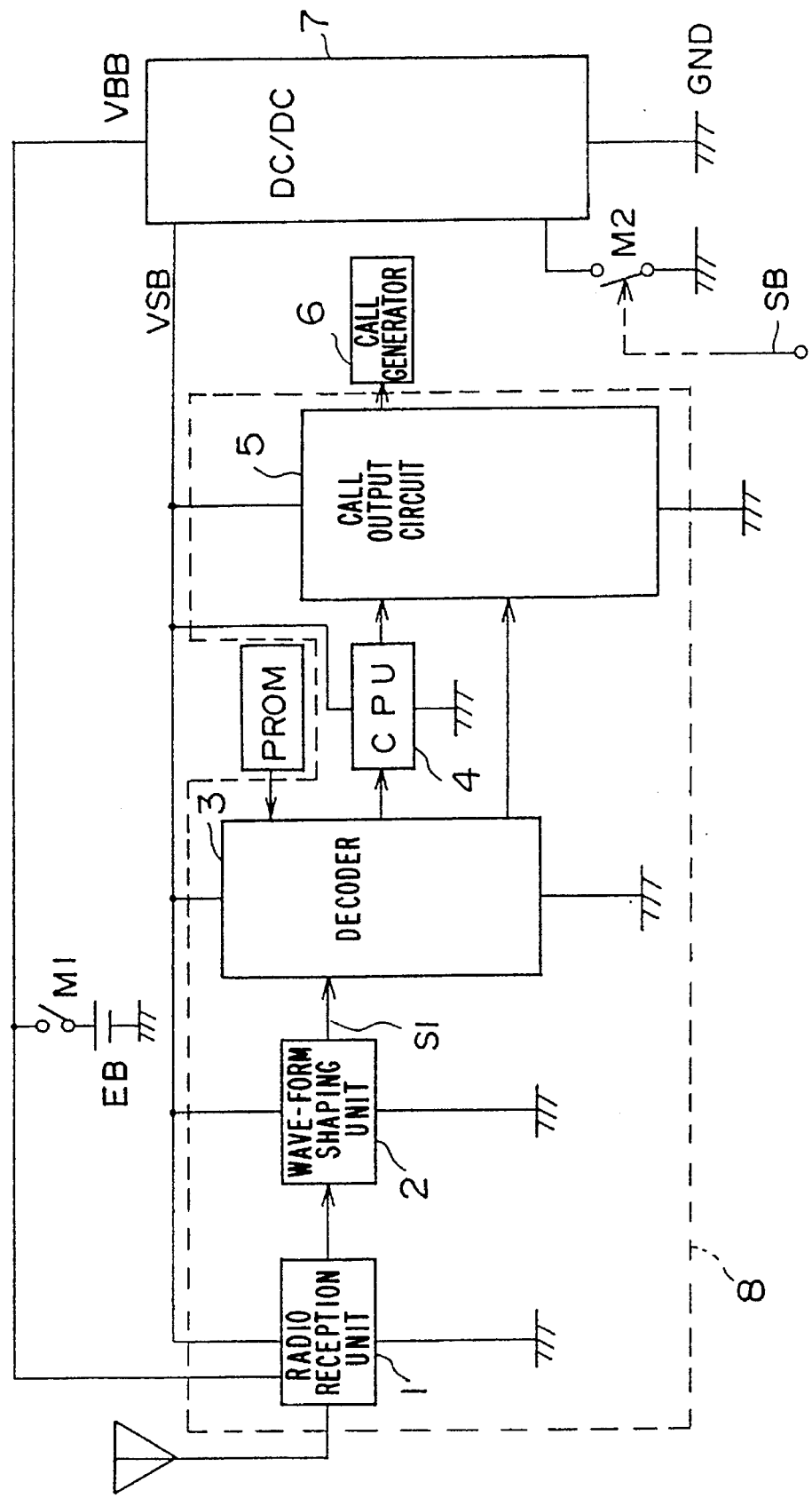
FIG. 1 shows the configuration of a radio select call receiver embracing a technology related to the present invention.
Figure 2:
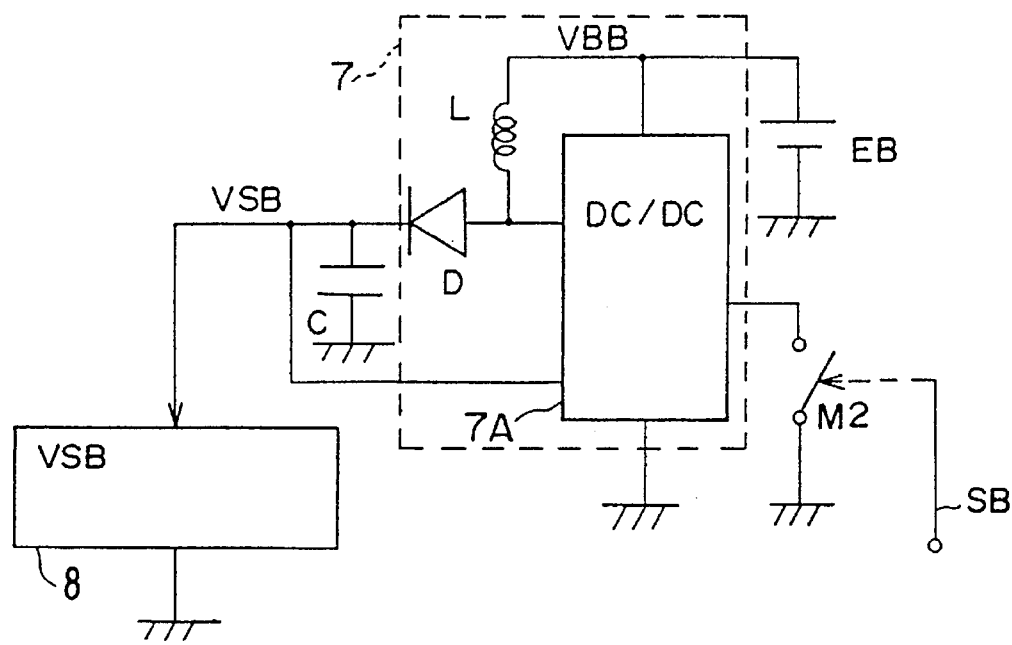
FIG. 2 is a diagram showing the configuration of a voltage generating circuit used for explaining problems encountered in the radio select call receiver embracing a technology related to the present invention of FIG. 1.

In the configuration of a voltage generating circuit embracing a technology related to the present invention shown in FIG. 2, a switching element M2 is connected to a DC/DC converter 7 for supplying a secondary power-supply voltage VSB to load circuits 8. The switching element M2 is turned on and off under the control of a stand-by mode signal which is referred to hereafter simply as an SB signal. The load circuits 8 comprise, among other components, a radio reception unit 1, a wave-form shaping unit 2, a decoder 3, a CPU 4 and a call output circuit 5 which are all driven by a secondary power-supply voltage VSB.

Figure 3A:
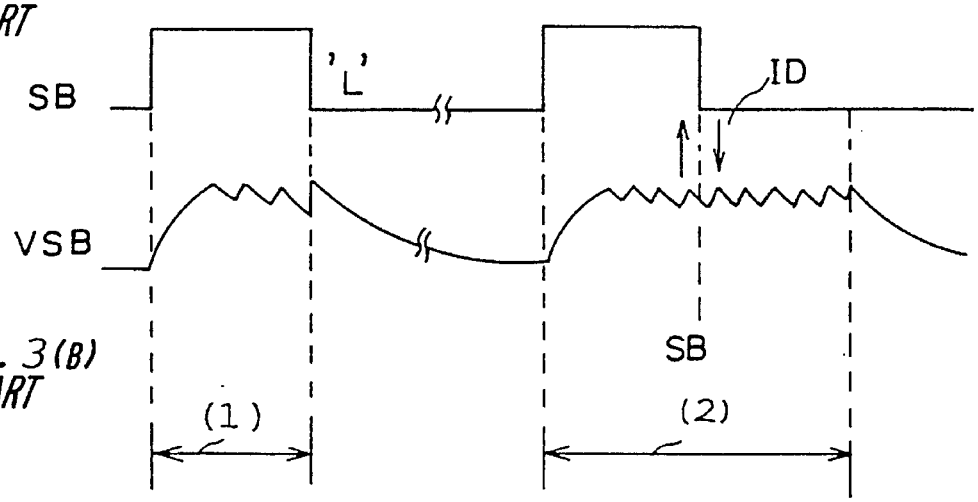
FIGS. 3(A) and 3(B) are wave-form diagrams used for explaining a relation between a secondary power-supply voltage and a stand-by mode signal of the radio select call receiver shown in FIG. 1.
Figure 3B:
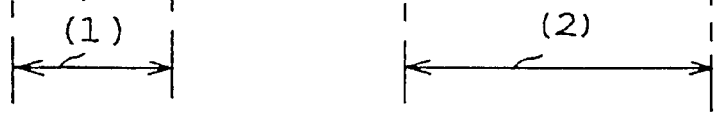

As described above, the switching element M2 is turned on and off by the SB signal in order to sample or to intermittently receive carrier waves modulated by a radio call signal S1. As shown in FIGS. 3(A) and 3(B), when the SB signal is set at a 'H' (high) level, the switching element M2 is turned on. The period during which the SB signal is set a 'H' level is called a DC/DC operative period (1). A primary power-supply voltage VBB generated by a battery EB undergoes voltage conversion in the DC/DC converter 7, causing the secondary power-supply voltage VSB to build up.

However, a capacitor (electrostatic condenser) C connected to the output of the DC/DC converter 7 prolongs the build-up time of the secondary power-supply voltage VSB. In addition, switching operations of the DC/DC converter 7 generates ripple components on the secondary power-supply voltage VSB.

Therefore, it takes a long time to process the received signal. This is because the radio reception unit 1, the wave-form shaping unit 2 and other components do not start operations until the secondary power-supply voltage VSB reaches a steady-state value. As a result, power consumed by the load circuits 8 increases due to the prolonged processing time.

Even if the steady-state voltage has been attained, an incorrect radio call signal S1 may be supplied to the decoder 3 by the wave-form shaping unit 2 in some cases. This is because the wave-shaping unit 2 is driven by the secondary power-supply voltage VSB which contains a ripple component. Such a malfunction contributes to the deterioration of the reliability of the radio select call receiver.

Furthermore, when a result of the decoding operation carried out by the decoder 3 indicates that the radio call signal S1 matches a unique call code ID assigned peculiarly to the radio select call receiver, the receiver exits from the SB mode, applying the secondary power-supply voltage VSB to the load circuits 8 connected to the DC/DC converter 7 as shown in FIG. 3. That is, the DC/DC operative period (1) is prolonged to a time such as a period (2).

As described above, the secondary power-supply voltage VSB is also applied to the radio reception unit 1, the wave-form shaping unit 2, the decoder 3 and so on even though, at the stage of transiting from processing of the radio signal to displaying a message, these components complete the signal processing one after another, actually requiring no longer the secondary power-supply voltage VSB. The fact that the secondary power-supply voltage VSB remains unnecessarily applied to components completing the signal processing also increases the power consumed by the load circuits 8.

The excessive power consumption shortens the life of the battery EB, thus, increasing the frequency of the battery replacement. As a result, this technology has a problem that the life of the radio select call receiver per battery is also shortened as well.

In order to solve the problems described above, an embodiment shown in FIG. 4 for implementing the principle of operation of a first power-supply control circuit in accordance with the present invention is introduced. As shown in the figure, the embodiment comprises a power-supply conversion circuit 11 for converting a primary power-supply voltage VBB generated by a power supply EB into a secondary power supply voltage VS generated at its output, a first switching element SW1$i$ for placing the power-supply conversion circuit 11, into an active state or an inactive state a second switching element SW2$j$ for placing a load circuit 13 driven by the secondary power-supply voltage VS into an active state or an inactive state, a capacitor Ci for accumulating electric charge provided by the secondary power-supply voltage VS and a control circuit 12 for placing the first switching element SW1$i$ and the second switching element SW2$j$ into an active state or an inactive state. The control circuit 12 supplies a control mode signal SB to the first and second switching elements SW1$i$ and SW2$j$.

Figure 5:
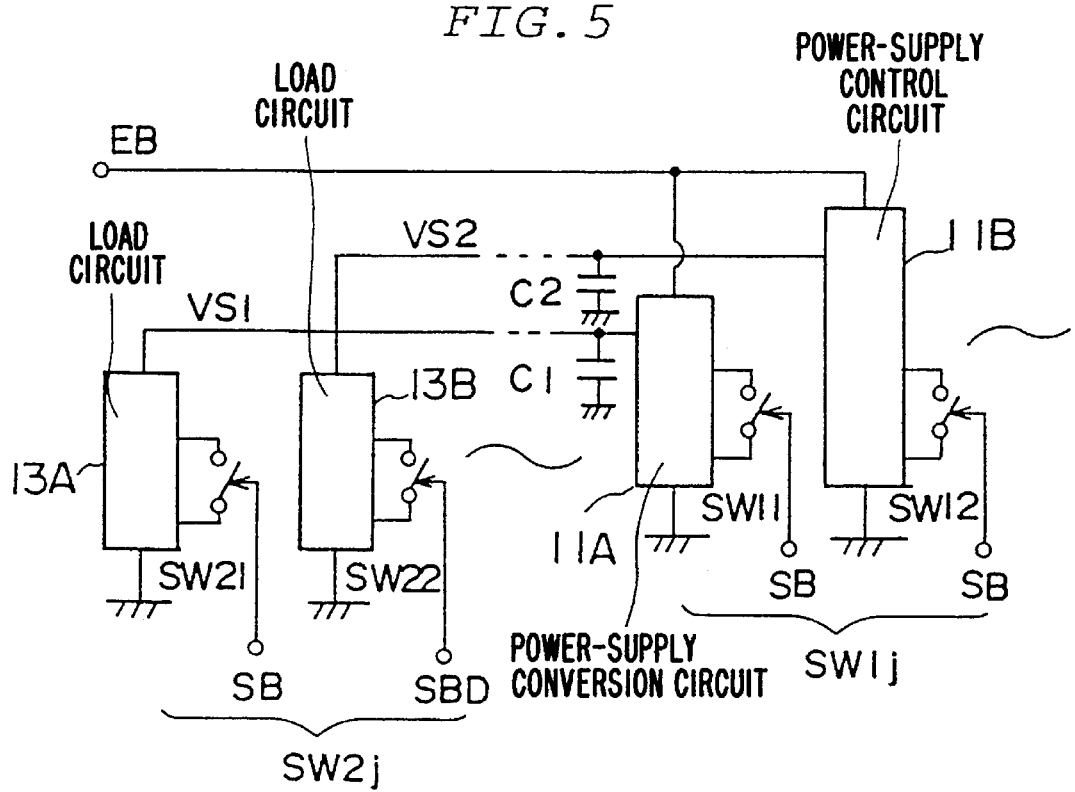
FIG. 5 shows typical wiring of switching elements employed in the power-supply control circuit shown in FIG. 4.

An embodiment implementing the principle of operation of a second power-supply control circuit in accordance with the present invention is shown in FIG. 5. As shown in the figure, the second power-supply control circuit comprises two or more power-supply conversion circuits 11 each connected to a first switching element SW1$i$ and two or more load circuits 13 each connected to a second switching element SW2$j$. A control circuit 12 generates a control mode signal SB and a delay pulse signal SBD to execute relay supply control on the second switching elements SW2$j$.

It should be noted that, in both the first and second power-supply control circuits, the control circuit 12 generates the delay pulse signal SBD as a continuation of the control mode signal SB.

Figure 6:
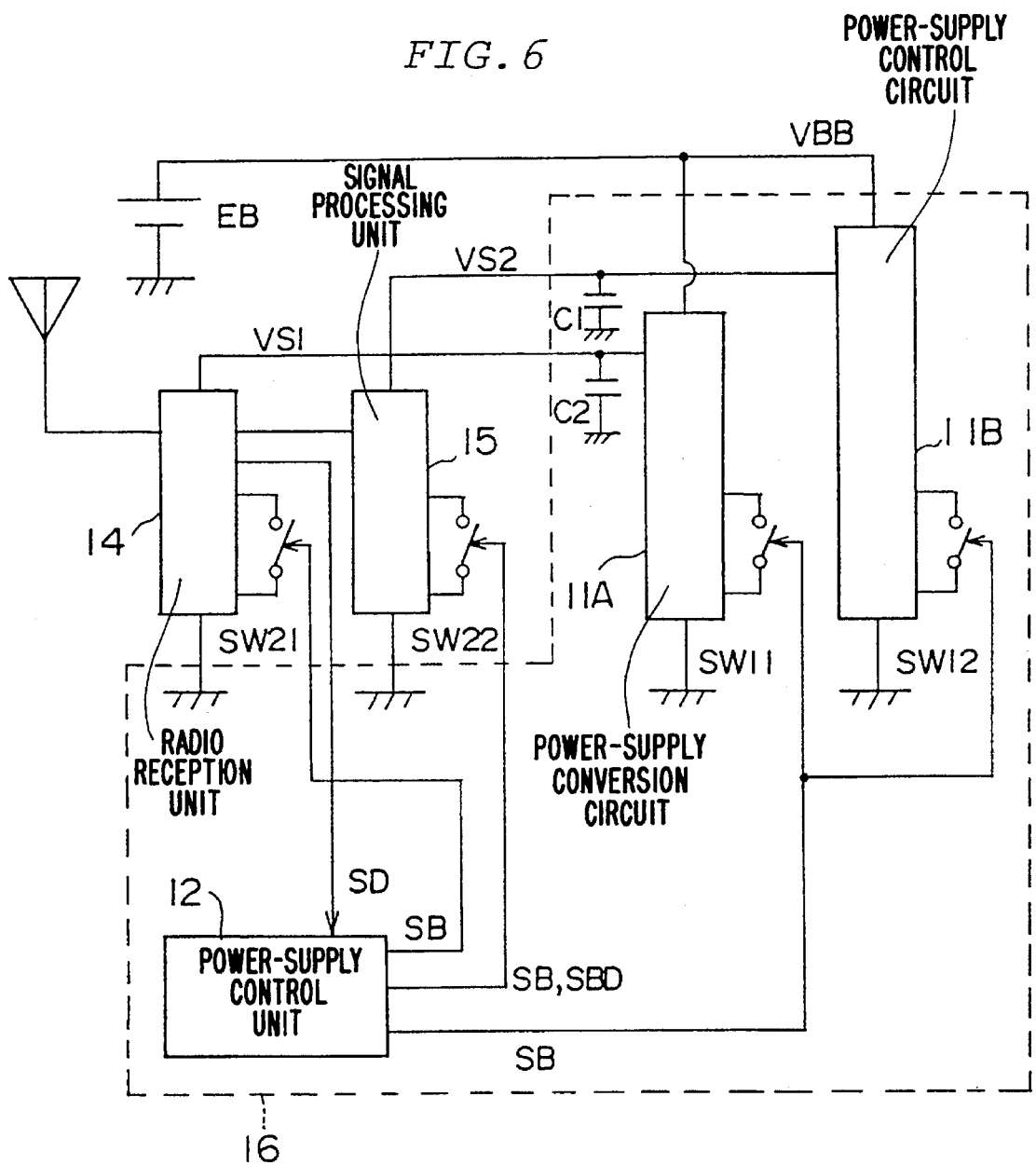
FIG. 6 shows the configuration of an embodiment implementing the principle of operation of a radio select call receiver in accordance with the present invention.

In addition, an embodiment implementing the principle of operation of a radio select call receiver driven by a power-supply voltage VBB generated by a battery EB serving as a primary power supply for receiving radio carrier waves in accordance with the present invention is shown in FIG. 6. As shown in the figure, the embodiment comprises a radio reception unit 14 for extracting a radio call signal S1 from the radio carrier waves and decoding the radio call signal S1, a signal processing unit 15 for processing various kinds of call processing based on a result of decoding the radio call signal S1, and a power-supply control circuit 16 for supplying a secondary power-supply voltage VS to the radio receiver unit 14 and the signal processing unit 15. The power-supply control unit 16 includes the first or/and second power-supply control circuits of the present invention described above.

In the radio select call receiver provided by the present invention, the radio reception unit 14 and the signal processing unit 15 are driven by secondary power-supply voltages VS1 and VS2 respectively which are different from each other. In addition, the operation of the signal processing unit 15 is controlled by a control mode signal SB and a delay pulse signal SBD.

When a call signal S1 is found out by the radio reception unit 14 or the signal processing unit 15 to match the unique call code ID of the radio select call receiver provided by the present invention, a delay control signal SD is supplied to a control circuit 12.

Figure 4:
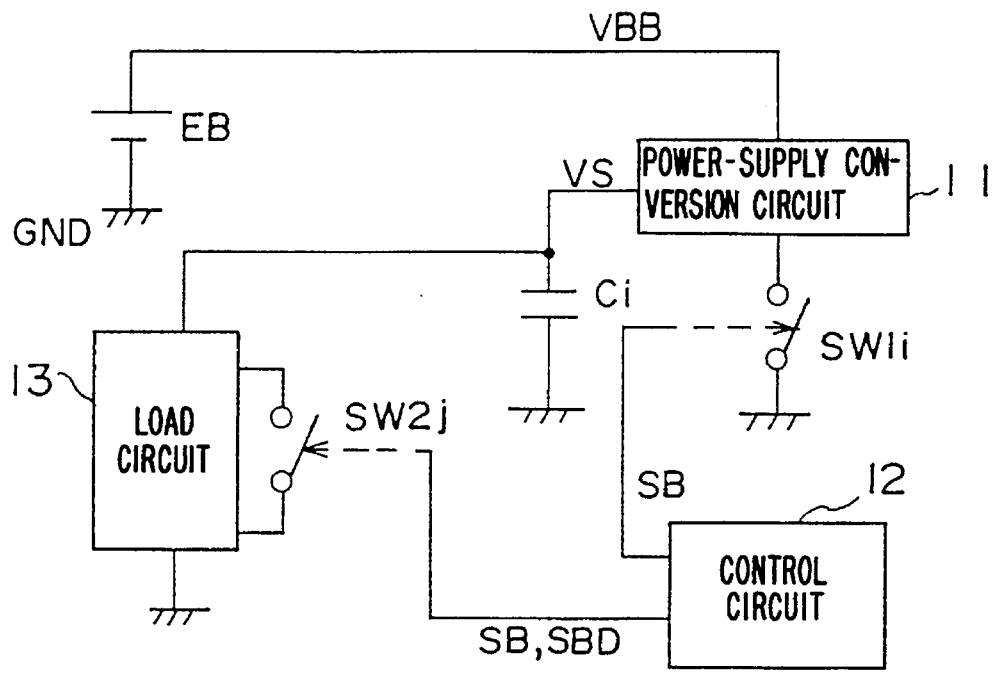
FIG. 4 shows the configuration of an embodiment implementing the principle of operation of a power-supply control circuit in accordance with the present invention.

Next, the principle of operation of the first power-supply control circuit of FIG. 4 provided by the present invention is explained. In order to halt functions of the load circuit 13, for example, the control mode signal SB supplied to the second switching element SW2$j$ as shown in FIG. 4 is set at an 'L' (low) level. The load circuit 13 thereby enters an inactive state, that is, an inoperative state. In addition, in order to operate the power-supply conversion circuit 11, the control mode signal SB supplied to the first switching element SW1$i$ is set at an 'L' (low) level. The power-supply conversion circuit 11 thereby enters an active state, that is, an operative state.

As described above, during an inoperative period of the load circuit 13, the control mode signal SB supplied to the second switching element SW2$j$ is set at an 'L' (low) level to stop the operation of the load circuit 13. During this period, the control mode signal SB set at the 'L' (low) level is also supplied by the control circuit 12 to the first switching element SW1$i$.

During this period, the power-supply conversion circuit 11 enters an operative state, generating a secondary power-supply voltage VS from the primary power supply EB. The secondary power-supply voltage VS is charged into a stray condenser of the load circuit 13 and an capacitor Ci with its load made inoperative as described above.

During an operative period of the load circuit 13, on the other hand, the control mode signal SB supplied to the second switching element SW2$j$ is set at a 'H' (high) level to cause the load circuit 13 to operate. During this period, the control mode signal SB set at the 'H' (high) level is also supplied by the control circuit 12 to the first switching element SW1$i$.

During this period, the power-supply conversion circuit 11 enters into an inoperative state. Driven by the secondary power-supply voltage VS of electric charge accumulated in the capacitor Ci, the load circuit 13 carries out signal processing.

In this way, the load circuit 13 operates intermittently. In the case of a small processing load, the load circuit 13 can probably be driven to operate by energy accumulated in the capacitor Ci during the inoperative period of the load circuit 13. Depending upon the capacitance of the capacitor Ci, enough energy may have been accumulated in the capacitor Ci for use by the load circuit 13 to handle the small processing load. In this case, the amount of the load must be small enough to allow the signal processing to be completed in a short time of the order of several tens of milliseconds.

Unlike the related art, from the point of time the control mode signal SB supplied to the second switching element SW2$j$ is set at a 'H' (high) level, signal processing can be carried out immediately due to the fact that the voltage has attained a steady-state value. This voltage is the secondary power-supply voltage VS applied to the high-potential side of the load circuit 13 during its inoperative period.

Unlike the related art, it thus becomes unnecessary to consider the build-up time of the capacitor Ci in the periods of the intermittent operations. While the load circuit 13 is operating, the power-supply conversion circuit 11 is in an inoperative state. As a result, the load circuit 13 can carry out signal processing by receiving a stable secondary power-supply voltage VS with no ripple components caused otherwise by the switching operation of the power-supply conversion circuit 11.

It should be noted that, in the power-supply control circuit provided by the present invention, the control circuit 12 may supply a delay pulse signal SBD to the load circuit 13 as a continuation of the control mode signal SB.

In other words, the extension of the operation period of the load circuit 13 is based on the control mode signal SB. That is, the delay pulse signal SBD is supplied to the second switching element SW2j in order to extend the operation of the load circuit 13. The delay pulse signal SBD serves as a pulse signal for extending the 'H' (high) level period of the control mode signal SB. This is because, in some cases, energy accumulated in the capacitor Ci is not large enough for driving the load circuit 13 so that it is necessary to continue the operation of the lead circuit 13 even after the energy is exhausted. However, the 'H' (high) pulse width of the control signal SB, which is also supplied by the control circuit 12 to the first switching element SW1i, cannot be changed. Accordingly, the power-supply conversion circuit 11 transits from an inoperative state to an operative state even though the delay pulse signal SBD is supplied to the load circuit 13.

As a result, while the delay pulse signal SBD is being supplied to the load circuit 13, the secondary power-supply voltage VS is applied to the load circuit 13 directly from the power-supply conversion circuit 11 for continuing the signal processing carried out thereby.

Next, the principle of operation of the second power-supply control circuit of FIG. 5 provided by the present invention is explained. Let us, for example, operate the load circuit 13A shown in FIG. 5. In this case, a control mode signal SB supplied to a second switching element SW21 connected to the load circuit 13A is set to an 'H' (high) level. The control mode signal SB set to the 'H' (high) level causes the load circuit 13A to enter an operative state but puts a power-supply conversion circuit 11A in an inoperative state.

In order to discontinue the operation of the load circuit 13A upon the completion of the desired signal processing thereby while keeping a load circuit 13B in an operative state, a delay pulse signal SBD is typically supplied to a second switching element SW22 connected to the load circuit 13B. In this way, the operation period of the load circuit 13B can be extended to a period longer than that of the load circuit 13A.

Therefore, supplies of power to the load circuits 13A and 13B can be cut off one after another sequentially starting, in the above example, with the load circuit 13A which has completed the desired signal processing. In other words, by setting the control mode signal SB supplied to the second switch SW21 connected to the load circuit 13A to a 'L' (low) level, the operation of the load circuit 13A is halted. The control mode signal SB set at the 'L' (low) level puts a power-supply conversion circuit 11A in an operative state, causing electric charge for the generation of a secondary power-supply voltage VS1 to be accumulated into an capacitor C1 with its load, the load circuit 13A, made inoperative.

The control scheme described above can reduce power consumed by the load circuits 13A, 13B and so on by putting them in an inoperative state one after another after the completion of desired signal processing. At the same time, malfunctions can be well prevented from occurring in the load circuits 13A, 13B and so on. As a result, the reliability of battery-powered electronic equipment employing the power-supply control circuit embedded therein can thus be enhanced.

Next, the principle of operation of the radio select call receiver of FIG. 6 provided by the present invention is explained. For example, let carrier waves modulated by a radio call signal S1 coming from a radio base station be received and demodulated by the radio reception unit 14. At that time, a control mode signal SB supplied to a second switching element SW21 connected to the radio reception unit 14 is set to a 'H' (high) level in order to put the radio reception unit 14 in an operative state. It should be noted that the control mode signal SB set to the 'H' (high) level causes a power-supply conversion circuit 11A to enter an inoperative state.

With the power-supply conversion circuit 11A put in an inoperative state, the radio reception unit 14 is driven by a secondary power-supply voltage VS1 of electric charge accumulated in an electronic condenser C1, carrying out signal processing. In this way, the radio select call receiver operates intermittently. In the case of a processing load small enough to be completed in a short time of typically several tens of milliseconds, the radio reception unit 14 can probably be driven to operate by energy accumulated in the capacitor C1 during the inoperative period of the radio reception unit 14. The amount of energy accumulated in the electro-static condenser C1, which depends upon the capacitance of the capacitor C1, may be large enough for use by the radio reception unit 14 to carry out signal processing.

In addition, when the radio reception unit 14 finds out that a radio call signal S1 matches a call code ID assigned uniquely to the radio select call receiver, the radio reception unit 14 supplies a delay control signal SD to a control circuit 12. The matching radio signal S1 puts a signal processing unit 15 in an operative state, following the inoperative state of the radio reception unit 14. In this case, a delay pulse signal SBD is typically supplied to a second switching element SW22 connected to the signal processing unit 15. The delay pulse signal SBD is generated by the control circuit 12 as requested by the delay control signal SD mentioned above. In this way, the signal-processing time of the signal processing unit 15 is extended to a period longer than that of the radio reception unit 14. In the signal processing unit 15, various kinds of signal processing are carried out.

Accordingly, supplies of power can be cut off sequentially one after another starting with the radio reception unit 14 which has completed the desired signal processing. The supply of power to the radio reception unit 14 is discontinued by setting the control mode signal SB supplied to the second switching element SW21 to a 'L' (low) level. The control mode signal SB set to the 'L' (low) level puts the radio reception unit 14 to an inoperative state but causes the power-supply conversion circuit 11A to enter an operative state, accumulating electric charge for the generation of the secondary power-supply voltage VS1 in the capacitor C1 with its load made inoperative.

In this way, relay supply control of the secondary power-supply voltages VS1 and VS2 can be performed on the radio receiver unit 14 and the signal processing unit 15 by using the power-supply control unit 16 which comprises the first and second power-supply control circuits provided by the present invention. Unlike the technology related to the present invention, from the point of time the control mode signal SB supplied to the second switching element SW2j is set at a 'H' (high) level, the signal processing can be carried out immediately due to the fact that the voltage has attained a steady-state value. This voltage is the secondary power-supply voltage VS1 or VS2 applied to the high-potential side of the radio reception unit 14 or the signal processing unit 15 during its inoperative period.

Unlike the related art, it thus becomes unnecessary to consider the build-up time of the capacitor Ci in the periods of their intermittent operations. As a result, the radio reception unit 14 can carry out signal processing by receiving a stable secondary power-supply voltage VS1 with no ripple components caused otherwise by the switching operation of the power-supply conversion circuit 11A.

The control scheme described above can shorten the time to execute the process of reception and reduce power consumed by the radio reception unit 14 and the signal processing unit 15. In addition, the number of malfunctions occurring during radio reception, wave-form shaping and decoding can be considerably reduced to enhance the reliability of the radio select call receiver. It should be noted that the life of the battery can be prolonged, lowering the frequency of the battery replacement. As a result, the life of the radio select call receiver per battery can also be lengthened as well.

Next, other preferred embodiments are explained by referring to accompanying diagrams.

Figure 7:
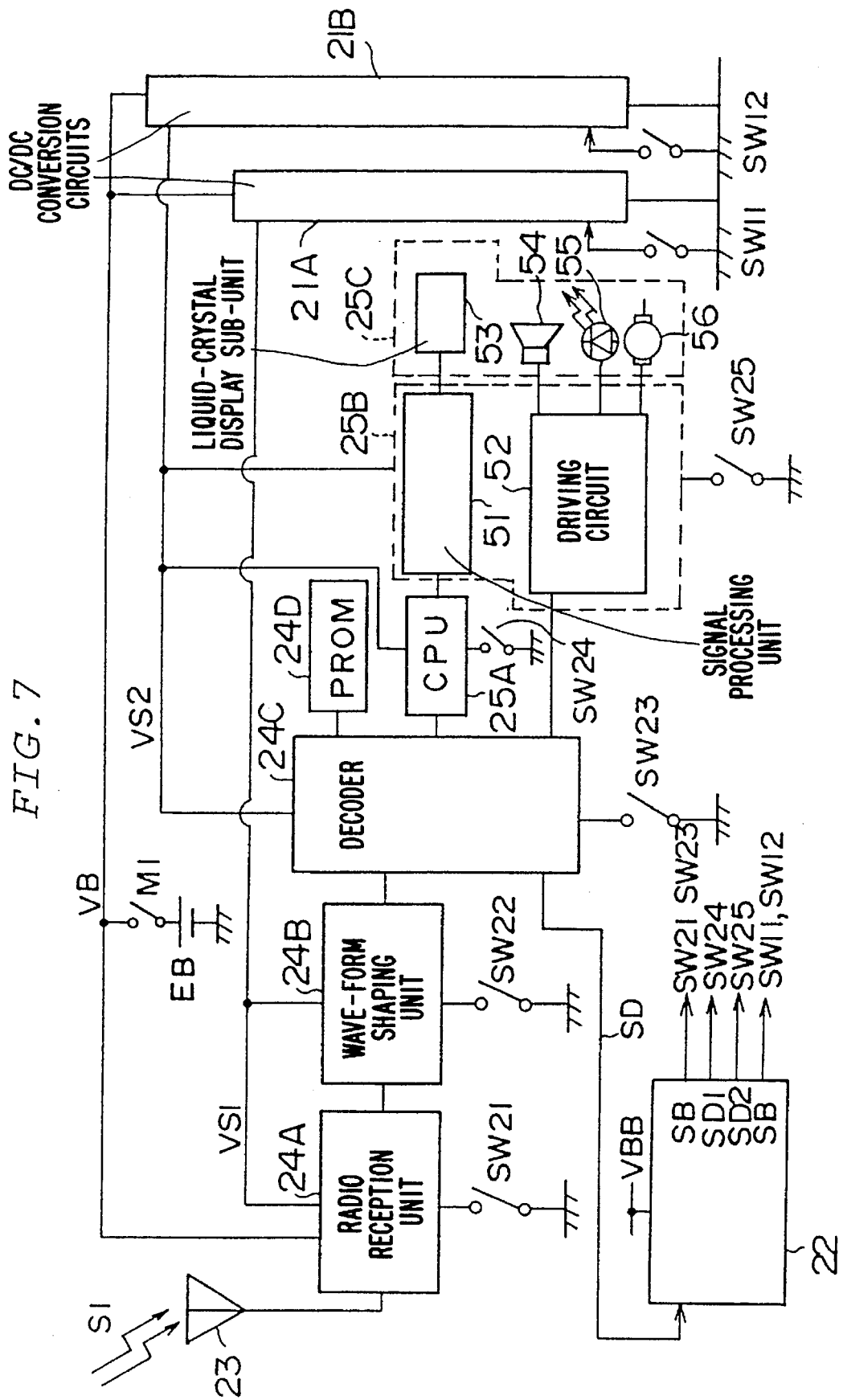
FIG. 7 shows the configuration of a preferred embodiment implementing a radio select call receiver, also referred to hereafter simply as a radio call receiver, employing an embedded power supply control circuit in accordance with the present invention.

An embodiment implementing a radio call receiver with a power-supply control circuit comprising two DC/DC converters for executing power-supply control in an SB mode is shown in FIG. 7. As shown in the figure, the radio call receiver comprises two DC/DC conversion circuits 21A and 21B, a timing generation circuit 22, an antenna 23, a radio reception unit 24A, a wave-form shaping unit 24B, a decoder 24C, a PROM unit 24D, a central processing unit (abbreviated hereafter as CPU) 25A, a call output circuit 25B, a message output unit 25C, switching elements M1, SW11, SW12 and SW21 to SW25 as well as a battery EB serving as a primary power supply.

The switching elements SW11 and SW12 are connected to the DC/DC conversion circuits 21A and 21B respectively and used for controlling the operations thereof.

Similarly, the switching elements SW21, SW22, SW23, SW24 and SW25 are connected to the radio reception unit 24A, wave-form shaping unit 24B, the decoder 24C, the CPU 25A and the call output circuit 25B respectively and used for controlling the operations thereof. For the sake of simplifying the explanation of the functions of the switching elements SW11, SW12 and SW 21 to 25, they are each connected between the components and ground lines GND as shown in the figure. In actuality, the connection is not restricted to those locations as long as the intended control of their operations can be executed.

The DC/DC conversion circuit 21A can be regarded as an embodiment of the power-supply control circuit 11A shown in FIG. 5 or part of the power-supply control circuit 11 employed in the power-supply control unit 16 shown in the diagram of FIG. 4 which is used for explaining its principle of operation. Driven by a terminal voltage VBB, also referred to hereafter as a battery voltage, of typically 1.5 V, the DC/DC conversion circuit 21A generates a secondary power-supply voltage VS1 of typically 2 V to be supplied to the radio reception unit 24A and the wave-form shaping unit 24B. As shown in the figure, the terminal voltage VBB is supplied by the battery EB.

On the other hand, the DC/DC conversion circuit 21B can be regarded as an embodiment of the power-supply control circuit 11B shown in FIG. 5 or part of the power-supply control circuit 11 employed in the power-supply control unit 16 shown in the diagram of FIG. 4 which is used for explaining its principle of operation. Driven by the terminal voltage EB mentioned above, the DC/DC conversion circuit 21B generates a secondary power-supply voltage VS2 of typically 5 V to be supplied to the decoder 24C, the CPU 25A and the call output circuit 25B. It should be noted that the DC/DC conversion circuits 21A and 21B will be further explained in detail by referring to examples shown in FIGS. 8 to 11.

The timing generation circuit 22 can be regarded as an embodiment of the control circuit 12 shown in the diagram of FIG. 4 which is used for explaining its principle of operation. The timing generator circuit 22 controls the operations of other components by actuating the switching elements SW11, SW12 and SW21 to 25 connected to the components. For example, the timing generation circuit 22 supplies a stand-by mode signal, referred to hereafter simply as an SB signal, to the switching elements SW11 and SW12 in order to control the operations of the DC/DC conversion circuits 21A and 21B respectively. It should be noted that the stand-by mode signal SB is a typical control mode signal.

The timing generation circuit 22 also supplies the SB signal to the switching elements SW21 to SW23 as well in order to control the operations of the radio reception unit 24A, the wave-form shaping unit 24B and the decoder 24C. In addition, the timing-generation circuit 22 also supplies a delay pulse signal SBD to the switching elements SW24 and SW25 in order to control the operations of the CPU 25A and the call output circuit 25B. The delay pulse signal SBD is an extension signal of the SB signal used for increasing the pulse width of the SB signal. The delay pulse signal SBD is activated by the timing generation circuit 22 when a delay control signal SD is received from the decoder 24C.

In this way, the configuration of the second power-supply control circuit shown in FIG. 5, a diagram used for explaining its principle of operation, can be realized. As described above, the timing generation circuit 22 supplies the SB signal and the delay pulse signal SBD to the switching elements SW21 to SW25, allowing relay supply control to be performed thereon.

The radio reception unit 24A, the wave-form shaping unit 24B, the decoder 24C and the PROM unit 24D constitute a typical embodiment implementing the radio receiver unit 14 shown in FIG. 6, a diagram used for explaining its principle of operation. As shown in FIG. 7, the radio reception unit 24A is connected to the antenna 23. Driven by a battery voltage VBB and the secondary power-supply VS1, the radio reception unit 24A receives and demodulates carrier waves modulated by a radio call signal S1 transmitted from a radio base station. It should be noted that, the second switching element SW21, a typical second switching element SW2j, is connected between the low-potential side of the radio reception unit 24A and a ground line GND. The switching element SW21 is controlled by the SB signal provided thereto, putting the radio reception unit 24A in either an operative or inoperative state.

The wave-form shaping unit 24B shapes the radio call signal S1 received and demodulated by the radio reception unit 24A then undergoes wave-form. Similarly, the second switching element SW22, another typical second switching element SW2j, is connected between the low-potential side of the wave-shaping unit 24B and a ground line GND. The switching element SW22 is also controlled by the SB signal provided thereto, putting the wave-form shaping unit 24B in either an operative or inoperative state.

The decoder 24C decodes the radio call signal S1 shaped by the wave-form shaping unit 24B and outputs of a decode result. Similarly, the second switching element SW23, still another typical second switching element SW2j, is connected between the low-potential side of the decoder 24C and a ground line GND. The switching element SW23 is also controlled by the SB signal provided thereto, putting the decoder 24C in either an operative or inoperative state. The PROM unit 24D is unerasable read-only memory for storing a peculiar call code ID assigned uniquely to the radio select call receiver.

The CPU 25A, the call output circuit 25B and the message output unit 25C constitute a typical embodiment implementing the signal processing unit 15 shown in FIG. 6, a diagram used for explaining its principle of operation. The CPU 25A compares a result of decoding the radio call signal S1 to the peculiar call code ID stored in the PROM unit 24D. Similarly, the second switching element SW24, still another typical second switching element SW2j, is connected between the low-potential side of the CPU 25A and a ground line GND. The switching element SW24 is also controlled by the SB signal provided thereto, putting the CPU 25A in either an operative or inoperative state.

It should be noted that, in the embodiments provided by the present invention, if the CPU 25A finds out that the result of decoding the output by the decoder 24C matches the peculiar call code ID stored in the PROM unit 24D, a delay control signal SD is output by the decoder 24C to the timing generation circuit 22. As an alternative, the delay control signal SD can also be output by the CPU 25A to the timing generation circuit 22 to give the same effect.

As shown in FIG. 7, the call output circuit 25B comprises a signal processing unit 51 and a driving circuit 52 for receiving the decoded result of the radio call signal S1 and carrying out various kinds of signal processing. Similarly, the second switching element SW25, still another typical second switching element SW2j, is connected between the low-potential side of the call output circuit 25B and a ground line GND. The switching element SW25 is also controlled by the SB signal provided thereto, putting the call output circuit 25B in either an operative or inoperative state.

As shown in FIG. 7, the message output unit 25C comprises a liquid-crystal display sub-unit 53, a speaker 54, a light emitting diode 55 and a motor 56. Receiving driving signals output by the signal processing unit 51 and the driving unit 52, the message output unit 25C typically outputs a message such as displayed information, generated sound, emitted light or vibration.

Next, an internal configuration of the DC/DC converters employed in the embodiments provided by the present invention is explained.

Figure 8:
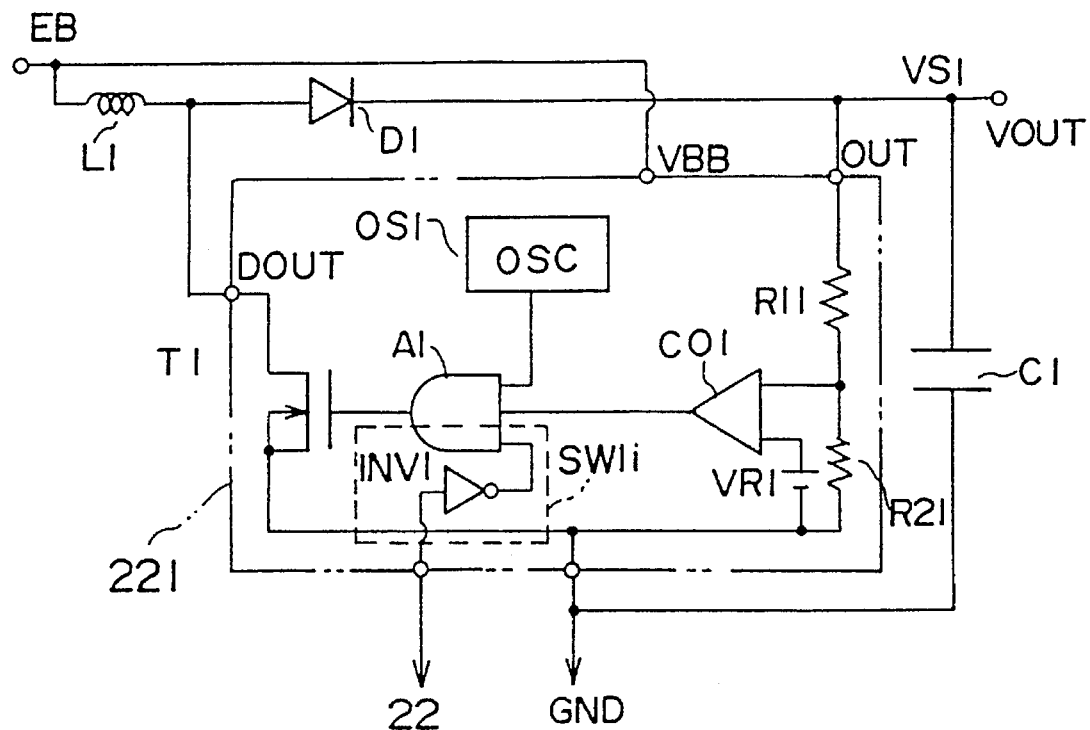
FIG. 8 shows the internal configuration of an MOSFET-typed DC/DC converter circuit employed in the radio call receiver shown in FIG. 7.

As shown in FIG. 8, the DC/DC conversion circuits 21A and 21B for raising the voltage VBB of the battery EB to secondary power-supply voltages VS1 and VS2 of typically 2 V and 5 V respectively each comprise a DC/DC control unit 221 for executing control functions as well as external components attached thereto such as a coil L1, a diode D1 and a condenser C1.

As shown in the figure, the DC/DC control unit 221 further comprises an n-typed field-effect transistor T1, referred to hereafter as an MOS transistor, a three-input AND gate A1, an inverter INV1, an oscillation circuit OS1, a comparator CO1, a reference power supply VR1 as well as bias resistors R11 and R21.

Typically, the DC/DC control unit 221 is connected between a ground terminal and a power-supply terminal VBB which is wired to the battery EB. One end of the coil L1 is connected to a driving output terminal DOUT of the DC/DC control unit 221. The other end of the coil L1 is connected to the battery EB. Also connected to the driving output terminal DOUT is the drain of the MOS transistor T1. The source of the MOS transistor T1 is, on the other hand, connected to a ground line GND.

The positive-side pin of the diode D1 is connected to the junction point of the coil L1 and the driving output terminal DOUT whereas the negative-side pin is connected to one end of a condenser C1 to prevent the reverse flow of current. The condenser C1 is an example of the condenser Ci shown in FIG. 4, a diagram used for explaining the principle of operation of the power-supply control circuit as described earlier. The condenser C1 is used for storing electric charge for providing and smoothing, typically, a secondary power-supply voltage VS1. The oscillation circuit OS1 is used for generating a clock signal with a reference oscillation frequency which is supplied to one of the inputs of the three-input AND gate A1. The inverter INV1 is connected between another input of the three-input AND gate A1 and a pin connected to the output of the timing generation circuit 22 for logically inverted a signal generated thereby.

The comparator CO1 and the reference power supply VR1 are used in conjunction with the bias resistors R11 and R21 for detecting the secondary power-supply voltage VS1 and comparing it to a reference voltage output by the reference power supply VR1. A result of the comparison is supplied to the third input of the three-input AND gate A1. A signal output by the three-input AND gate A1 is supplied to the gate of the MOS transistor T1.

Driven by the signal output by the three-input AND gate A1, the MOS transistor T1 carries out switching operations which are capable of raising an output voltage VS1 above the voltage of the battery EB. When the MOS transistor T1 is turned on, for example, energy is stored in the coil L1. When the MOS transistor T1 is turned off, on the other hand, an output voltage VS1 is raised from the voltage output by the battery EB by an amount corresponding to the energy accumulated in the coil L1. The raised voltage VS1 is smoothed into a final output voltage by the condenser C1 through the diode D1 connected to the other end of the coil L1 for preventing a reverse flow of current. As shown in FIG. 8, the condenser C1 is connected between the other end of the diode D1 and a ground line GND.

The comparator CO1 compares the output of a resistance-typed potential divider of the voltage VS1 to the voltage of the reference power supply VR1. If the output voltage VS1 is found to be lower than a desired value, the comparator CO1 outputs a 'H' (high)-level signal. It should be noted that, by adjusting the ratio of the resistance-typed potential divider, the desired output voltage VS1 can be set to any arbitrary value in the range 2 to 5 V.

It should be kept in mind that the DC/DC control unit 221 is put in an operative state by the output of the inverter INV1 set to a 'H' (high) level. When the signal output by the inverter INV1 is pulled down to a 'L' (low) level, the DC/DC control unit 221 enters an inoperative state. As shown in FIG. 8, the output of the inverter INV1 is connected to one input of the three-input AND gate A1.

All the three inputs to the three-input AND gate A1 are high when the following three conditions are met:

a. The clock signal output by the oscillation circuit OS1 is at a 'H' (high) level.

b. The signal output by the comparator CO1 is set at a 'H' (high) level, indicating that the output voltage VS1 is lower than a desired value.

c. The control mode signal SB is set at a 'L' (low) level to indicate an SB mode.

In the states described above wherein the output voltage VS1 is lows than a desired potential, the signal output by the three-input AND gate A1 also goes high, turning on the MOS transistor T1. The output volts VS1 is again raised from the output potential of the battery EB by an amount corresponding to energy accumulated in the coil L1.

As electric charge accumulated into the capacitor C1 raises the output voltage VS1 to a potential exceeding the desired value, the output of the comparator CO1 goes low, turning off the MOS transistor T1. In this state, energy is not stored in the coil L1.

From the above description, it is obvious that the inverter INV1 and the three-input AND gate A1 control the operation of the DC/DC control unit 221. In other words, the function of the switching element SW1i shown in FIG. 8 is executed by the inverter INV1 and a portion of the three-input AND gate A1.

In the SB mode wherein the load circuits such as the radio reception unit 24A, the wave-form shaping unit 24B, the decoder 24C, the PROM unit 24D and the CPU 25A are put in an inoperative state, the DC/DC conversion circuits 21A and 21B inversely enter an operative state. In this state, the MOS transistor T1 is turned on, allowing electric charge to be accumulated in the capacitor C1 with its loads made inoperative till the output voltage VS1 attains a desired potential.

It should be noted that, when a radio call signal S1 is found out to match the unique call code ID, the decoder 24C activates the delay control signal SD in order to release load circuits from the SB (stand-by) state. The load circuits thereby enter an operative state, carrying out signal processing.

Figure 9:
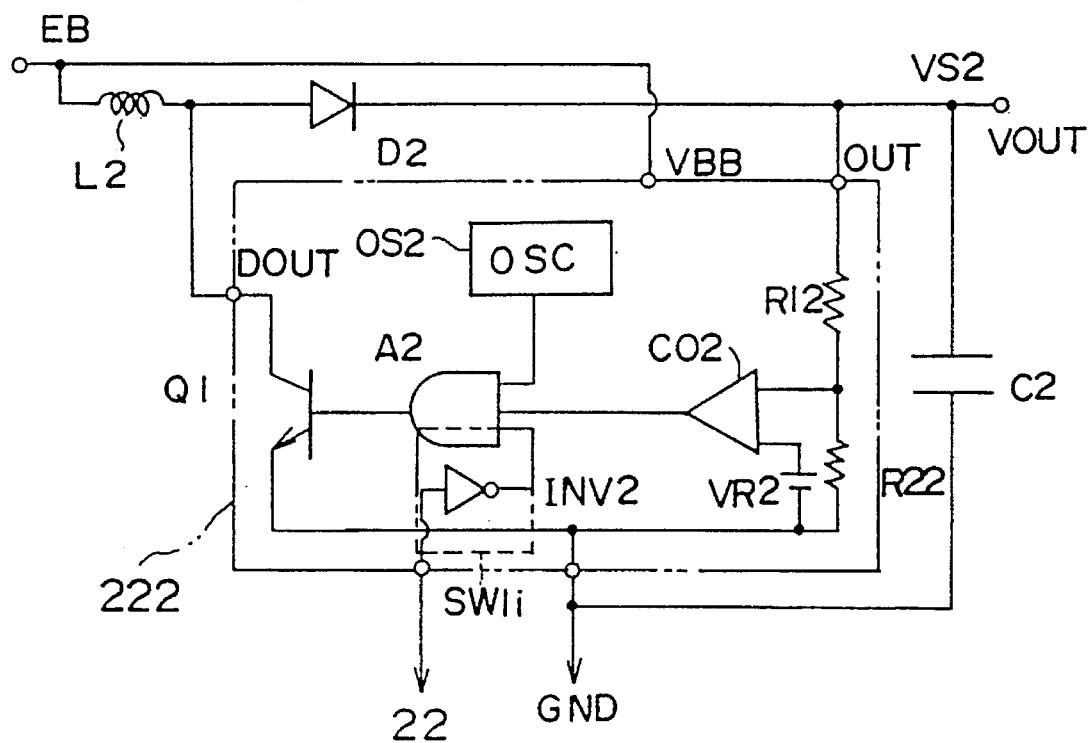
FIG. 9 shows the internal configuration of a bipolar-transistor-typed DC/DC conversion circuit employed in the radio call receiver shown in FIG. 7.

FIG. 9 shows the configuration of the bipolar-transistor type of the DC/DC conversion circuits 21A and 21B which comprises a DC/DC control unit 222 for executing control functions as well as external components attached thereto such as a coil L2, a diode D2 and a condenser C2.

As shown in the figure, the DC/DC control unit 222 further comprises a bipolar transistor Q1, a three-input AND gate A2, an inverter INV2, an oscillation circuit OS2, a comparator CO2, a reference power supply VR2 as well as bias resistors R12 and R22.

Typically, the collector of the bipolar transistor Q1 is connected to a driving output terminal VOUT through the diode D2 whereas its emitter is wired to the ground line GND. The base of the bipolar transistor is connected to the output of the three-input AND gate A2. It should be noted that the since rest of the configuration is the same as that for the DC/DC conversion circuits 21A and 21B shown in FIG. 8, its explanation is omitted.

Much like the MOS transistor T1, the bipolar transistor Q1 is switched on and off to raise an output voltage VS2 above the output potential of the battery EB. When the MOS bipolar Q1 is turned on, for example, energy is stored in the coil L2. When the bipolar transistor Q1 is turned off, on the other hand, the output voltage VS2 is raised from the voltage output by the battery EB by an amount corresponding to the energy accumulated in the coil L2. The raised voltage VS2 is smoothed into a final output voltage by the condenser C2 through the diode D2 connected to the other end of the coil L2 for preventing a reverse flow of current. As shown in FIG. 9, the condenser C2 is connected between the other end of the diode D2 and a ground line GND.

As described above, the DC/DC conversion circuits 21A and 21B are implemented by the embodiments shown in FIGS. 8 and 9 wherein the oscillation circuits OS1 and OS2 are connected to the inputs of the three-input AND gates A1 and A2 respectively. Embodiments wherein oscillation circuits OS3 and OS4 are connected to the outputs of AND gates A3 and A4, instead of their inputs, are shown in FIGS. 10 and 11 respectively.

Figure 10:
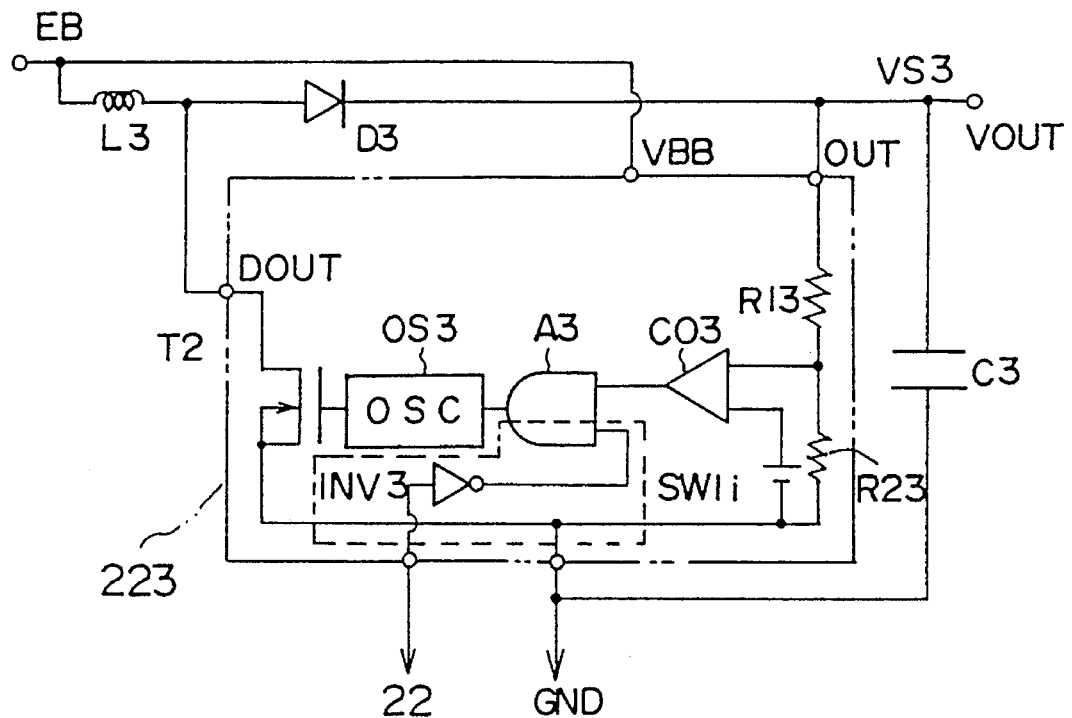
FIG. 10 shows the internal configuration of a DC/DC conversion circuit of the (MOSFET+OSC-cut) type employed in the radio call receiver shown in FIG. 7.
Figure 11:
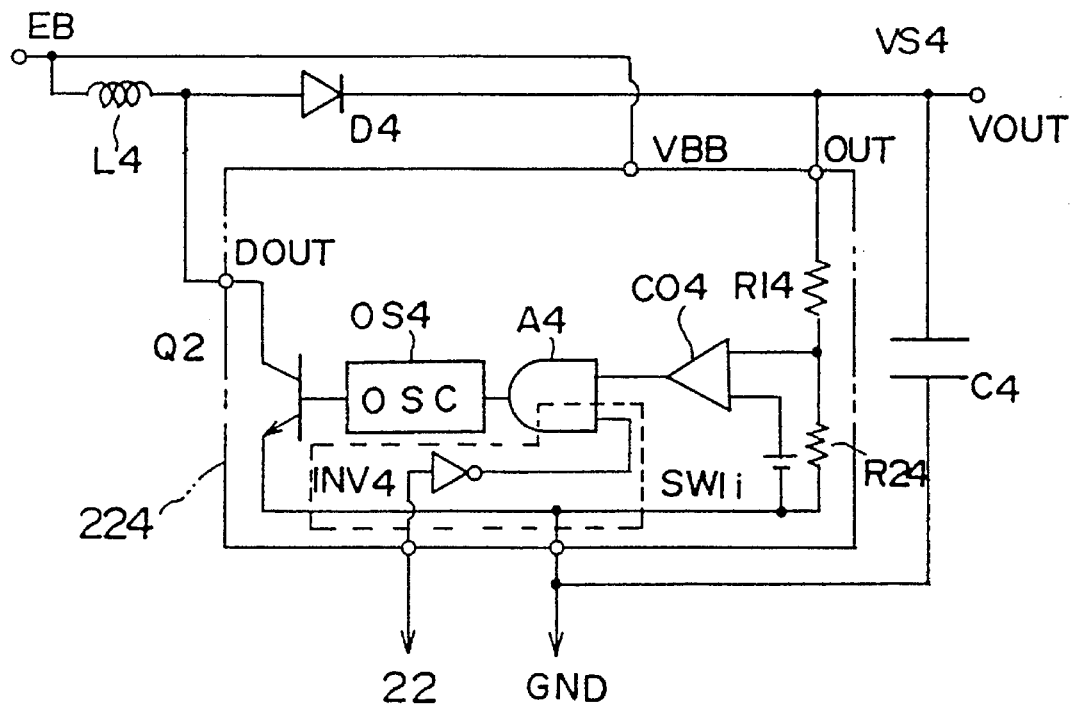
FIG. 11 shows the internal configuration of a DC/DC conversion circuit of the (bipolar-transistor+OSC-cut) type employed in the radio call receiver shown in FIG. 7.

An embodiment implementing the DC/DC conversion circuits 21A and 21B wherein an MOS transistor is employed is shown in FIG. 10. In this configuration, the oscillation of an oscillation circuit OS3 can be halted. As shown in the figure, the embodiment comprises a DC/DC control unit 223 for executing control functions as well as external components attached thereto such as a coil L3, a diode D3 and a condenser C3.

The DC/DC control unit 223 further comprises an MOS transistor T2, a two-input AND gate A3, an inverter INV3, an oscillation circuit OS3, a comparator CO3, a reference power supply VR3 as well as bias resistors R13 and R23.

The oscillation circuit OS3 is connected between the gate of the MOS transistor T2 and the output of the two-input AND gate A3. The DC/DC control unit 223 is in an operative or inoperative state when the output of the inverter INV3 is set at a 'H' (high) or 'L' (low) level respectively. The output of the inverter INV3 is connected to one input of the two-input AND gate A3. The other input of the two-input AND gate is connected to the output of the comparator CO3.

The inputs to the two-input AND gate are all set at a 'H' (high) level when the following conditions are met:

a. The output of the comparator CO3 is set at a 'H' (high) level to indicate that the output voltage VS3 is lower than a value set in advance.

b. The control mode signal SB is set at an 'L' (low) level to request an SB mode.

In the state described above, the oscillation circuit OS3 oscillates, supplying a signal having an oscillation frequency to the gate of the MOS transistor T2. The MOS transistor T2 carries out switching operations, raising the output voltage VS3 to a desired value.

As the output voltage VS3 exceeds the desired value, the output of the comparator CO3 is pulled down to an 'L' (low) level, putting the oscillation circuit OS in an inoperative state. With the oscillation circuit OS3 ceasing to oscillate, the MOS transistor T2 is turned off, allowing energy to be not accumulated in the coil L3.

In the SB mode wherein the load circuits are put in an inoperative state, the DC/DC conversion circuits 21A and 21B inversely enter an operative state as in the case with the DC/DC conversion circuits 21A and 21B shown in FIG. 8. In this state, the MOS transistor T2 is carrying out switching operations, allowing electric charge to be accumulated in the capacitor C3 with its loads made inoperative till the output voltage VS3 attains a desired potential.

It should be noted that, when a radio call signal S1 is found out to match the unique call code ID, the decoder 24C activates the delay control signal SD in order to release load circuits from an SB (stand-by) state. The load circuits thereby enter an operative state.

An embodiment implementing the DC/DC conversion circuits 21A and 21B wherein a bipolar transistor is employed for executing switching operations is shown in FIG. 11. As shown in the figure, the embodiment comprises a DC/DC control unit 224 for executing control functions as well as external components attached thereto such as a coil L4, a diode D4 and a condenser C4.

The DC/DC control unit 224 further comprises a bipolar transistor Q2, a two-input AND gate A4, an inverter INV4, an oscillation circuit OS4, a comparator CO4, a reference power supply VR4 as well as bias resistors R14 and R24.

As shown in the figure, the oscillation circuit OS4 is connected between the gate of the bipolar transistor Q2 and the output of the two-input AND gate A4. It should be noted that since the rest of the configuration is the same as that shown in FIG. 10, its description is omitted.

Much like the MOS transistor T2, the bipolar transistor Q2 carries out switching operations, raising the output voltage VS4 to a desired value above the output potential of the battery EB. The DC/DC control unit 224 is in an operative or inoperative state when the output of the inverter INV4 is set at a 'H' (high) or 'L' (low) level respectively.

Figure 12:
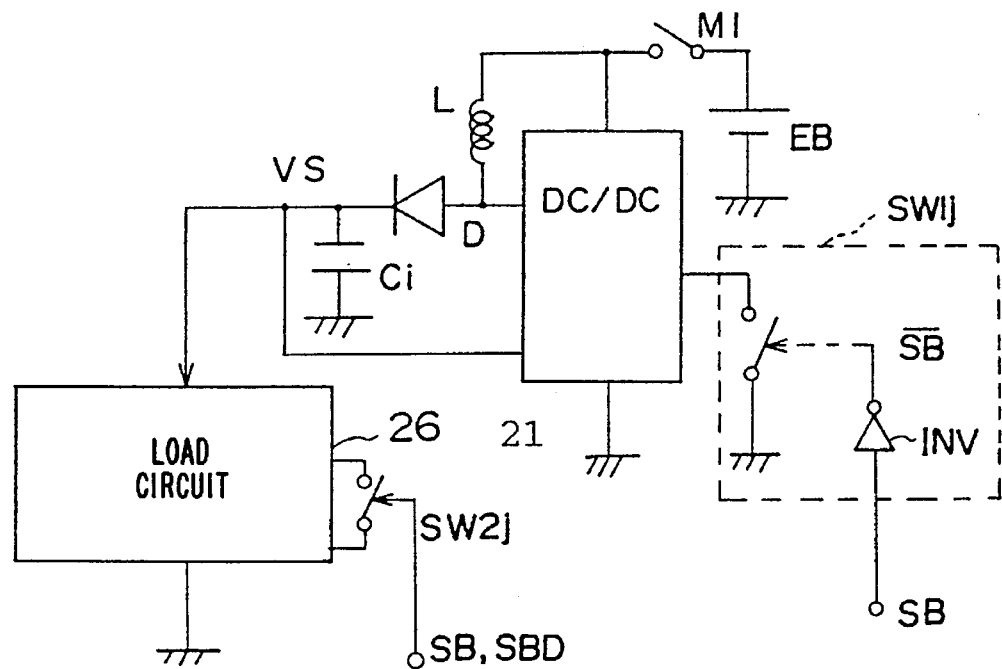
FIG. 12 shows a peripheral circuit of a DC/DC control unit employed in the radio call receiver shown in FIG. 7.
Figure 12:
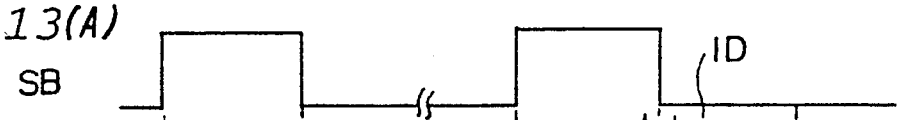
Figure 12:
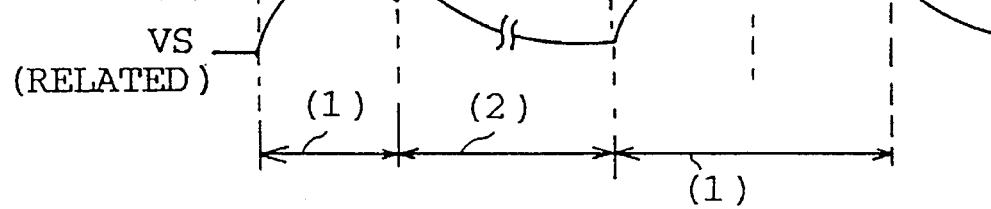
Figure 12:
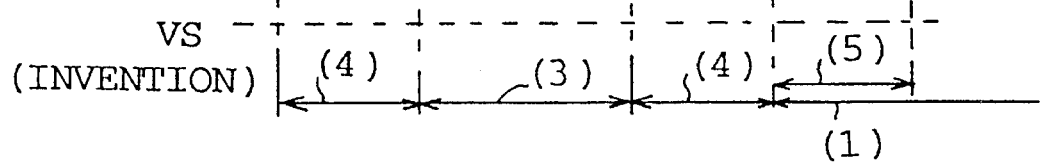

Next, the principle of operation of a radio call receiver employing a power-supply control circuit provided by the present invention is explained by referring to FIGS. 12 to 14 in addition to FIG. 7. FIGS. 14(A)–14(I) show operation timecharts of the radio call receiver shown in FIG. 7. As the power-supply switch M1 of the radio call receiver is turned on by the user, carrier waves modulated by a radio call signal S1 coming from a radio base station are received by the antenna 23 and demodulated by the radio reception unit 24A.

As indicated by the operation timecharts of FIGS. 14(A)–14(I), the SB signal supplied to the switching circuits SW21 to SW23 shown in FIG. 7 are set to a 'H' (high) level to put the radio reception unit 24A, the wave-form shaping unit 24B and the decoder 24C in an operative state. However, the SB signal set at the 'H' (high) level causes the DC/DC conversion circuits 21A and 21B to enter an inoperative state. With the DC/DC conversion circuits 21A and 21B set in an inoperative state, the radio reception unit 24A, the wave-form shaping unit 24B and the decoder 24C are driven by the secondary power-supply voltages VS1 and VS2 of electric charge accumulated in the condenser Ci, carrying out signal processing.

In brief, the radio call receiver operates intermittently. In the case of a processing load small enough to be completed in a short time of typically 30 milliseconds, the radio reception unit 24A, the wave-form shaping unit 24B and the decoder 24C can be driven to finish the processing by energy accumulated in the capacitor Ci during the inoperative period of the radio reception unit 24A, the wave-form shaping unit 24B and the decoder 24. It should be noted, however, that the amount of energy accumulated in the electrostatic capacitor Ci depends upon the capacitance of the capacitor Ci.

As shown in FIG. 12, simply let a load circuit 26 be driven by a secondary power-supply voltage VS generated by a DC/DC conversion circuit 21 for the sake of explanation simplicity. In actuality, however, the load circuit 26 may be driven by the secondary power-supply voltages VS1 and VS2 while the DC/DC converter circuit 21 may comprise the DC/DC conversion circuits 21A and 21B as described earlier. A timing generation circuit 22 produces an SB signal to put the load circuit 26 and the DC/DC conversion circuit 21 in an operative or inoperative state in a complementary manner. That is, when the load circuit 26 is put in an operative state, the DC/DC conversion circuit 21 enters an inoperative state and vice versa.

To be more specific, when the SB signal shown in FIGS. 13(B)–13(C) is set at an 'L' (low) level, the load circuit 26 is put in an inoperative state. The same signal SB signal set to the 'L' level is also supplied by the timing generation circuit 22 to the DC/DC conversion circuit 21 or, to be more specific, to the DC/DC control unit 221, 222, 223 or 224 of FIGS. 8, 9, 10 or 11 employed in the DC/DC control circuit 21. However, the signal SB is logically inverted by an inverter INV therein to reversely put the DC/DC conversion circuit 21 or, to be more specific the DC/DC conversion circuit 21A or 21B shown in FIG. 7, in an operative state denoted by reference numeral (3) in FIGS. 13(A)–13(C). In this case, electric charge from a battery EB is stored in stray condensers of the load circuit 26 and a condenser Ci with its load made inoperative to build up a secondary power-supply voltage VS.

When the SB signal supplied to the load circuit 26 through a switching element SW2j is set at a 'H' (high) level, on the other hand, the load circuit 26 is put in operative state. Likewise, the same signal SB signal set to the 'H' level is also supplied by the timing generation circuit 22 to the DC/DC conversion circuit 21 or, more specifically, to the DC/DC control unit 221, 222, 223 or 224 of FIGS. 8, 9, 10 or 11 employed in the DC/DC control circuit 21. However, the signal SB is logically inverted by the inverter INV therein to reversely put the DC/DC conversion circuit 21 or, to be more specific the DC/DC conversion circuit 21A or 21B shown in FIG. 7, in an inoperative mode. In this case, the load circuit 26 is driven by the secondary power-supply voltage VS provided by electric charge accumulated in the condenser 26 to carry out signal processing.

Referring now to the radio call receiver shown in FIG. 7, when the decoder 24C decodes a radio call signal S1, a delay control signal SD set to a 'H' (high) level is supplied to the switching element SW24 connected to the CPU 25A. As shown in the operation timecharts of FIGS. 14(A)–14(I), the delay control signal SD serves as a continuation of the SB signal immediately following it. The delay control signal SD allows the CPU 25A to compare the decoded radio signal S1 to a unique call code ID. If the CPU 25A finds out that they match each other, the decoder 24C or the CPU 25A activates the delay control signal SD supplied to the timing generation circuit 22.

When the delay control signal SD supplied to the timing generation circuit 22 is activated as a result of decoding the radio control signal S1, the call output circuit 25B is put in an operative state following the deactivation of the radio processing unit 24A. In this case, a delay pulse signal SBD shown in FIGS. 14(A)–(I) is typically supplied to the switching element SW25 connected to the call output circuit 25B. Driven by the delay pulse signal SBD, the signal processing unit 51 and the driving circuit 52 employed in the call output circuit 25B activate, among other components, the liquid-crystal display sub-unit 53, the speaker 54, the light emitting diode 55 and the motor 56. This period is called a message display period denoted by reference numeral (5) in FIGS. 13(A)–13(C). During this period, a message such as a display, sound, emitted light or vibration is output.

It should be noted that, during a period denoted by reference numeral (6), the secondary power-supply voltage VS2 is directly supplied from the DC/DC converter 21B to the CPU 25A and the call output circuit 25B. For example, this period is between the completion of signal demodulation or decoding and the turning-off of the power-supply switch M1 by the user. It may be the predetermined message outputting period itself denoted by reference numeral (5).

As described so far, the radio call receiver provided by the present invention comprises DC/DC conversion circuits 21A and 21B, a timing generation circuit 22, an antenna 23, a radio reception unit 24A, a wave-form shaping unit 24B, a decoder 24C, a PROM unit 24D, a CPU 25A, a call output circuit 25B, a message output unit 25C, switching elements M11, SW11, SW12 and SW21 to SW25 as well as a battery EB as shown in FIG. 7.

Supplies of power to the radio processing unit 24A, the wave-form shaping unit 24B, the decoder 24C, the CPU 25A and so on are cut off sequentially one after another starting with a component completing desired signal processing. By setting a control mode signal SB supplied to the switching elements SW21 to SW23 connected to the radio processing unit 24A, the wave-form shaping unit 24B and the decoder 24C respectively to an 'L' (low) level, the radio processing unit 24A, the wave-form shaping unit 24B and the decoder 24C are put in an inoperative state. The mode control signal SB set at the 'L' (low) level causes the DC/DC conversion circuits 21A and 21B to enter an operative state, allowing electric charge to be accumulated in a condenser C1 with its loads made inoperative till a secondary power-supply voltage VS1 attains a desired value. It should be noted that the charging period is typically about 420 ms.

By using the DC/DC conversion circuits 21A and 21B constituting the power-supply control circuit provided by the present invention in conjunction with the switching elements SW11, SW12 and SW21 to SW23, relay supply control of the secondary power-supply voltages VS1 and VS2 can thus be performed on the radio reception unit 24A, the wave-form shaping unit 24B, the decoder 24C, the CPU 25A and the call output circuit 25B. In addition, when compared to the wave form of the secondary power-supply voltage of the related art shown in the upper portion of FIGS. 13(A)–13(C), a steady-state voltage shown in the lower part of FIGS. 13(A)–13(C) drives the radio reception unit 24A, the wave-form shaping unit 24B, the decoder 24C, the CPU 25A and the call output circuit 25B, allowing signal processings to be started immediately at the time the mode control signal SB supplied to the switching elements SW21 to SW23 is set to a 'H' (high) level. That is to say, at the time the SB signal is set to the 'H' level, the upper curve of FIGS. 13(A)–13(C) representing the secondary power-supply voltage VS provided by the technology related to the present invention starts to build up while the lower curve of FIGS. 13(A)–13(C) representing the secondary voltages VS1 and VS2 output by the power-supply control circuit provided by the embodiment of the present invention has already reached a steady-state value, allowing the signal processings to be carried out right away by the radio reception unit 24A, the wave-form shaping unit 24B, the decoder 24C, the CPU 25A and the call output circuit 25B. This is because in the inoperative state of the radio reception unit 24A, the wave-form shaping unit 24B, the decoder 24C, the CPU 25A and the call output circuit 25B, the secondary power-supply voltages VS1 and VS2 have been built up on the high-potential side of the radio reception unit 24A, the wave-form shaping unit 24B, the decoder 24C, the CPU 25A and the call output circuit 25B.

Unlike the related art, it thus becomes unnecessary to take the build-up time of the condenser Ci in the periods of the intermittent operations into consideration. At least driven by stabilized secondary power-supply voltages with no ripple components, the radio reception circuits 24A, the wave-form shaping unit 24B and the decoder 24C are allowed to carry out signal processing.

In addition, the reception and processing times of the radio call receiver can be shortened and, at the same time, power consumed by the radio reception unit 24A, the wave-form shaping unit 24B, the decoder 24C and the CPU 25A power-supply voltages VS1 can be reduced. Furthermore, the number of malfunctions occurring in the processes of wave-form shaping and decoding can be decreased to a value much lower than that for the technology related to the present invention, hence, making it possible to enhance the reliability of the radio select call receiver. Since the life of the battery is lengthened, the frequency to replace the battery is decreased. As a result, the life of the radio select call receiver per battery can also be increased as well.

The embodiment of the present invention described so far comprises to DC/DC conversion circuits 21A and 21B used for controlling supplies of power in conjunction with switching elements SW11, SW12 and SW21 to SW25. It should be noted, however, that only one DC conversion circuit 21A or 21B can be used for carrying out relay supply control of the switching elements SW11, SW12 and SW21 to SW25 depending upon the power supply series driving the transistor and the message unit employed in the load circuit 26 to give the same effects. Accordingly, all versions of the embodiments within the scope of the true spirit and the range of the present invention are included in the claims.

What is claimed is:

1. A power-supply control circuit comprising:
    a power-supply conversion circuit converting a primary power-supply voltage into a secondary power-supply voltage;
    a first switching element coupled to the power-supply conversion circuit and switching said power-supply conversion circuit into one of an active state and an inactive state;
    a capacitor, coupled to the power-supply conversion circuit, smoothing said secondary power-supply voltage and outputting a smoothed secondary power-supply voltage;
    a load circuit, coupled to the power-supply conversion circuit and to the capacitor, receiving and driven by said smoothed secondary power-supply voltage;
    a second switching element coupled to the load circuit and switching the load circuit into one of an active state and an inactive state;
    a control circuit, coupled to the first switching element and to the second switching element, supplying a control mode signal to each of said first switching element and to said second switching element, respectively, wherein the control circuit controls the first switching element to one of activate the power-supply conversion circuit to charge the capacitor and inactivate alternately the power-supply conversion circuit, and, concurrently and respectively, the control circuit controls the second switching element to one of inactivate and activate alternately the load circuit, thereby driving the load circuit with electric charges accumulated on the capacitor, and a period in which the second switching element is activating the load circuit is longer than a period in which the first switching element is inactivating the power-supply conversion circuit, and, as a result, a period occurs in which the load circuit and the power-supply conversion circuit are activated simultaneously.

2. A power-supply control circuit according to claim 1, further comprising at least a second power-supply conversion circuit converting a respective primary power-supply voltage into a respective secondary power-supply voltage, each power-supply conversion circuit generating voltages different from each other.

3. A power-supply control circuit according to claim 2, further comprising at least a second first switching element switching each corresponding at least a second power-supply conversion circuit into one of an active state and an inactive state based on a respective control mode signal.

4. A power-supply control circuit according to claim 2, further comprising at least a second capacitor corresponding to and smoothing each respective secondary power-supply voltage.

5. A power-supply control circuit according to claim 1, further comprising at least a second switching element and at least a second load circuit, each at least a second switching element corresponding to each at least a second load circuit and switching the at least a second load circuit based on a respective control mode signal.

6. A power-supply control circuit for converting a primary power-supply voltage into a secondary power-supply voltage;
- a first switching element coupled to the power-supply conversion circuit and switching said power-supply conversion circuit into one of an active state and an inactive state;
- a capacitor, coupled to the power-supply conversion circuit, smoothing said secondary power-supply voltage and outputting a smoothed secondary power-supply voltage;
- a load circuit, coupled to the power-supply conversion circuit and to the capacitor, receiving and driven by said smoothed secondary power-supply voltage;
- a second switching element coupled to the load circuit and switching the load circuit into one of an active state and an inactive state;
- a control circuit, coupled to the first switching element and to the second switching element, supplying a control mode signal to each of said first switching element and to said second switching element, respectively, wherein the control circuit supplies a delay control signal extending said control mode signal transmitted to said second switching element, wherein the control circuit controls the first switching element to one of activate and inactivate alternately the power-supply conversion circuit, and, concurrently and respectively, the control circuit controls the second switching element to one of inactivate and activate alternately the load circuit, and wherein a period in which the second switching element is activating the load circuit is longer than a period in which the first switching element is inactivating the power-supply conversion circuit, and, as a result, a period occurs in which the load circuit and the power-supply conversion circuit are activated simultaneously.

7. A radio select call receiver comprising:
- radio reception means, driven by a first power-supply voltage, for receiving radio carrier waves and identifying a unique call signal conveyed by said radio carrier waves;
- signal processing means for performing call processing based on said unique call signal; and
- a power-supply control circuit comprising:
  - a power-supply conversion circuit converting a primary power-supply voltage into a secondary power-supply voltage,
  - a first switching element coupled to the power-supply conversion circuit and switching the power-supply conversion circuit into one of an active state and an inactive state,
  - a capacitor, coupled to the power-supply conversion circuit, smoothing said secondary power-supply voltage and outputting a smoothed secondary power-supply voltage,
  - a second switching element coupled to the signal processing means and switching the signal processing means into one of an active state and an inactive state, said signal processing means driven by said smoothed secondary power-supply voltage, and
  - a control circuit, coupled to the first switching element and to the second switching element, supplying a control mode signal to each of said first switching element and second switching element, respectively, wherein the control circuit controls the first switching element to one of activate the power-supply conversion circuit to charge the capacitor and inactivate alternately the power-supply conversion circuit, and, concurrently and respectively, the control circuit controls the second switching element to one of inactivate and activate alternately the load circuit, thereby driving the load circuit with electric charges accumulated on the capacitor, and a period in which the second switching element is activating the load circuit is longer than a period in which the first switching element is inactivating the power-supply conversion circuit, and, as a result, a period occurs in which the load circuit and the power-supply conversion circuit are activated simultaneously.

8. A radio select call receiver according to claim 7, further comprising at least a second power-supply conversion circuit converting a respective primary power-supply voltage into a respective secondary power-supply voltages, each power-supply conversion circuit generating voltages different from each other.

9. A radio select call receiver according to claim 7, further comprising at least a second first switching element switching each corresponding at least a second power-supply conversion circuit into one of an active state and an inactive state based on a respective control mode signal.

10. A radio select call receiver according to claim 7, further comprising at least a second switching element switching said radio reception means and said signal processing means into one of an active state and an inactive state based on the control mode signal.

11. A radio select call receiver according to claim 7, further comprising at least a second capacitor corresponding to and smoothing each respective secondary power-supply voltage.

12. A radio select call receiver comprising:
- radio reception means, driven by a first power-supply voltage, for receiving radio carrier waves and identifying a unique call signal conveyed by said radio carrier waves;
- signal processing means for performing call processing based on said unique call signal; and
- a power-supply control circuit comprising:
  - a power-supply conversion circuit converting a primary power-supply voltage into a secondary power-supply voltage,
  - a first switching element coupled to the power-supply conversion circuit and switching the power-supply conversion circuit into one of an active state and an inactive state,
  - a capacitor, coupled to the power-supply conversion circuit, smoothing said secondary power-supply voltage outputting a smoother secondary power-supply voltage,
  - a second switching element coupled to the signal processing means and switching the signal processing means into one of an active state and an inactive state, said signal processing means driven by said smoothed secondary power-supply voltage smoothed, and
  - a control circuit, coupled to the first switching element and to the second switching element, supplying a control mode signal to each of said first switching element and second switching element, respectively, wherein one of the radio reception means and the signal processing means outputs a delay control signal to the control circuit if said unique call signal is recognized, said delay control signal extending the control mode signal, wherein the control circuit controls the first switching element to one of activate and inactivate alternately the power-supply conversion circuit, and, concurrently and respectively, the control circuit controls the second switching element to one of inactivate and activate alternately the load circuit, and wherein a period in which the second switching element is activating the load circuit is longer than a period in which the first switching element is inactivating the power-supply conversion circuit, and, as a result, a period occurs in which the load circuit and the power-supply conversion circuit are activated simultaneously.

13. A control circuit controlling a system comprising a power-supply conversion circuit, a load circuit connected to an output of the power-supply conversion circuit, a capacitor coupled to the power-supply conversion circuit and the load circuit, and a switching element activating and inactivating the load circuit, said control circuit comprising:

a signal generator generating a first signal activating the power-supply conversion circuit to charge the capacitor and controlling the switching element to inactivate the load circuit, and a second signal inactivating the power-supply conversion circuit and controlling the switching element to activate the load circuit thereby driving the load circuit with electric charges accumulated on the capacitor, wherein the signal generator generates the first signal and the second signal alternately, so that a first control by the first signal to activate the power-supply conversion circuit and to control the switching element to inactivate the load circuit, and a second control by the second signal to inactivate the power-supply conversion circuit and to control the switching element to activate the load circuit are executed alternately, and wherein a period in which the second signal is activating the load circuit is longer than a period in which the first signal is inactivating the power-supply conversion circuit, and, as a result, a period occurs in which the load circuit and the power-supply conversion circuit are activated simultaneously.

* * * * *